United States Patent [19]

Manber et al.

[11] Patent Number: 5,274,774
[45] Date of Patent: Dec. 28, 1993

[54] FIRST-COME FIRST-SERVE ARBITRATION PROTOCOL

[75] Inventors: Udi Manber, Tucson, Ariz.; Mary K. Vernon, Madison, Wis.

[73] Assignee: Wisconsin Alumni Research Foundation, Madison, Wis.

[21] Appl. No.: 879,059

[22] Filed: Apr. 30, 1992

Related U.S. Application Data

[63] Continuation of Ser. No. 304,701, Jan. 31, 1989, abandoned.

[51] Int. Cl.⁵ .................... G06F 13/00; G06F 13/362
[52] U.S. Cl. .......................... 395/325; 364/242.7; 364/242.8; 364/230.1; 364/282.4
[58] Field of Search ............... 395/650, 700, 325

[56] References Cited

U.S. PATENT DOCUMENTS

| | | | |
|---|---|---|---|
| 3,629,854 | 12/1971 | Hauck | 395/325 |
| 3,761,879 | 9/1973 | Brandsma et al. | 395/325 |
| 3,813,651 | 5/1974 | Yamada | 395/325 |
| 4,099,233 | 7/1978 | Barbagelata et al. | 395/250 |
| 4,257,095 | 3/1981 | Nadir | 395/325 |
| 4,263,649 | 4/1981 | Lapp, Jr. | 395/325 |
| 4,321,669 | 3/1982 | Macmillan | 395/325 |
| 4,363,094 | 12/1982 | Kaul et al. | 395/325 |
| 4,374,413 | 2/1983 | Comfort et al. | 395/725 |
| 4,374,414 | 2/1983 | Comfort et al. | 395/725 |
| 4,375,639 | 3/1983 | Johnson, Jr. | 395/325 |
| 4,385,350 | 5/1983 | Hansen et al. | 395/325 |
| 4,418,386 | 11/1983 | Vrielink | 395/325 |
| 4,419,724 | 12/1983 | Branigin et al. | 395/325 |
| 4,463,445 | 7/1984 | Grimes | 395/325 |
| 4,488,217 | 12/1984 | Binder et al. | 395/375 |
| 4,600,988 | 7/1986 | Tendulkar et al. | 395/325 |
| 4,682,282 | 7/1987 | Beasley | 395/775 |
| 4,920,486 | 4/1990 | Nielsen | 395/325 |

OTHER PUBLICATIONS

Gustavson, David B., "Computer Buses—A Tutorial," *IEE Micro*, Aug. 1984.

Vernon and Manber, "Distributed Round-Robin and First-Come First-Serve Protocols and Their Application to Multiprocessor Bus Arbitration," *Computer Sciences Technical Report #745*, Feb. 1988.

*Primary Examiner*—Gareth D. Shaw
*Assistant Examiner*—John Q. Chavis
*Attorney, Agent, or Firm*—Quarles & Brady

[57] ABSTRACT

A first-come first-serve arbitration protocol arbitrates between processing agents seeking access to a common bus. The system is an extension of a parallel contention arbiter in which each agent has an identity value made up of two portions, one a fixed portion and one a variable portion. The variable portion of each agent's identity is incremented depending on how long the agent has been waiting for access to the bus and the variable portion is the most significant portion of each agent's identity. Thus in each arbitration in which the highest identity value is awarded control of the bus, the agent which has waited the longest will gain access to the bus prior to those which have not waited as long.

5 Claims, 3 Drawing Sheets

FIRST-COME FIRST-SERVE ARBITRATION PROTOCOL

CROSS-REFERENCE TO RELATED APPLICATIONS

This application is a continuation of U.S. Ser. No. 07/304,701 filed Jan. 31, 1989, now abandoned.

FIELD OF THE INVENTION

This invention pertains to the field of computer system resource allocation arbitration protocols.

BACKGROUND OF THE INVENTION

As computer systems and networks become increasingly complex and include increasing amounts of distributed or parallel processing, the method by which a system allocates usage of common resources can have a significant effect on the overall capability of a system. Such allocation methods and their supporting hardware define arbitration protocols by which the system arbitrates among agents competing for the same resource. While the problem of arbitration may arise with respect to a variety of system resources, such as processors, storage devices or memory segments, it is best characterized and understood when the resource is a communication channel, typically a communication bus.

Computer buses are used to communicate and transfer data between various parts of a computer or to or from peripheral devices. Buses may be confined to a circuit board, used to communicate from one circuit board to another, or even used to allow different processing units to communicate. This invention is useful in the arbitration of control of buses that accommodate a priority arbiter, such as a parallel contention arbiter of the type described in UK Patent Specification No 1099575, and by Taub D. M. "Arbitration and Control Acquisition in the Propose IEEE 896 Futurebus," *IEEE Micro*, 4:4, pp. 52-62 (1984). One particularly relevant application for such a bus arbiter is for control of buses that are used for communicating between multiple processors located in one or more computing machines.

Buses are electrical conductors, usually copper wire, copper patterns or aluminum patterns. A bus is simply the parallel electrical lines used to carry a designated number of signals with a specified format for data or addresses applied to the bus.

When an agent (a device, e.g. a processor) wishes to communicate with another agent, the first agent sends signals that cause the second agent to respond. These signals are collectively called the address or identity. The device that begins the communication is called the master, and the device that responds is called the slave. Some agents can act only as masters, some only as slaves, and other as either masters or slaves.

It is inherent in a bus that only one agent at a time may use the bus, otherwise indefinite conditions would exist. When two agents attempt to use the bus at the same time, a mechanism or protocol must decide which agent shall be able to use the bus. This mechanism is called arbitration. Details of buses and arbitration schemes may be found in *Computer Buses13 A Tutorial* by David B. Gustavson, Aug. 1984, IEEE Micro, p. 7, herein incorporated by reference.

The "star" arbitration scheme uses a central arbiter which is connected to each agent by two dedicated wires. One wire is used to allow the agent to send a request signal to the central arbiter, and the second wire is used to allow the central arbiter to send a bus granted signal to the agent. Thus for N agents, two * N extra wires are needed to arbitrate bus access. The central arbiter can use any of a number of schemes to arbitrate requests for the bus in a fast and efficient manner. However, such special wiring is comparatively expensive.

The so-called daisy chain method is a second arbitration scheme. Under this protocol, all agents share a bus request line and each agent has one daisy-in input line and one daisy-out output line. The daisy-in line receives an input signal from the previous agent, and the daisy-out line is connected to send an output signal to the next adjacent agent. When an agent does not want control of the bus, the signal on the daisy-in input is passed through to the daisy out output. When an agent wants control of the bus it forces a "zero" on the daisy-out output and a "one" on the shared bus request line. The shared bus request line is a wired-OR line that may be actuated by any agent. Any agent wishing to use the bus thus asserts the shared bus request line by asserting a logical "one" on the line. This places a one on the daisy-in input of the highest priority agent. If the first priority agent does not want to use the bus, it passes the one through to its daisy-out output. The signal is passed along in a daisy-chain manner until an agent seeking control of the bus receives a logical one on its daisy-in in-put. If no agent preceding the asserting agent wants the bus, the signal from the shared bus request line will be passed through to the asserting agent, and a bus grant signal will appear on the asserting agent's daisy-in input. If a preceding agent desires the bus, the preceding agent will gain control of the bus and will continue placing a zero on its daisy-out output, and all subsequent agents (including the asserting agent) will be inhibited from using the bus. Thus, the closer an agent is to the beginning of the daisy chain, the higher priority the agent has. Also, rules are necessary to prevent a high priority agent from taking the bus away from a low priority agent while it is in use. This may be accomplished by synchronizing request assertions. The daisy chain is economical but slow, and it requires every agent be in place to complete the daisy chain bus grant line. This scheme also does not have much fairness among the agents, since higher priority agents will be able to disproportionately dominate control of the bus.

A third scheme, the parallel contention arbiter as described in the references cited above, is based on assigning each agent a unique fixed k-bit arbitration number called its "identity." The value of k is at least $[\log_2(N+1)]$, where N is the maximum number of agents that can be attached to the bus. An agent that wants control of the bus forces a wired-OR shared bus request line, and waits for a signal to start arbitration. The signal to start arbitration may be generated by the current bus master, a central timing controller, or any agent on the bus. At the start of an arbitration, the agent applies its arbitration number to a separate parallel set of arbitration control lines provided on the bus for this purpose. The agent then monitors each of the arbitration lines, in parallel. If the value carried by line i is "1," but the agent is applying a "0" to it, then the agent removes the lower-order $(i-1$ to $0)$ bits of its identity. If line i drops back to "0," the agent reapplies the lower-order bits it removed before. For example, consider the case where two agents with identities 1010101 and 0011100, respectively, are requesting the bus. The first agent will remove its three lowest order bits, leaving 1010000, and the second agent will remove all of its bits. Next, the first agent will reapply its three lowest order bits, and the second agent will do nothing, since the most significant bit still remains. It is easy to see that after some period of time the system reaches steady state, in which the lines carry the largest identity of all competing agents. The agent whose arbitration number matches the winning number becomes the next bus master. Note that at the end of the arbitration, each agent knows the identity of the winner, as well as whether it has won or lost. The parallel contention arbiter thus described is a priority arbiter that is very fast but is also inherently unfair, since an agent with a higher identity will always win an arbitration against an agent with a lower identity, and thus higher priority agents will disproportionately control the bus.

The parallel contention arbiter, due to its low cost and high speed, has been adopted in several multiprocessor system bus designs. To overcome the unfairness inherent in the basic priority selection mechanism, assured access protocols have been designed to provide a set of agents (i.e. the processors) with equal access to the bus. These protocols are based on batching requests, such that all requests in a batch are served before any new requests can be made. In particular, requests in the batch from agents with low assigned identities will receive service before new requests can be made by agents with high assigned identities.

In one protocol, all requests that arrive to an idle bus assert the bus request line and form a batch. An agent in the batch competes during each arbitration until it has been granted ownership of the bus. An agent that generates a new request while a batch is in progress must wait for the batch to end before asserting the request line and competing for access. The end of the batch is generally signalled by a logical "0" on the request line, since each agent in the batch releases the request line at the start of its bus tenure. All requests that are waiting at the end of a batch assert the shared request line and form a new batch. Agents in a batch receive service in order of their assigned identities, according to the parallel contention arbitration.

In a second assured access protocol, an agent with a request asserts the request line and competes in successive arbitrations until acquiring the bus. At the completion of its bus tenure, the agent marks itself as "inhibited," and won't assert the request line or compete for bus ownership until a fairness release operation takes place. The fairness release operation is a cycle in which no agents assert the request line. In other words, either there are no outstanding requests, or all agents with outstanding requests are inhibited.

The second protocol implements a batching algorithm similar to the first protocol. A batch starts and ends with a fairness release cycle. No agent is bus master more than once in a batch, but an agent with a request that is generated during a batch is allowed to join the batch if the agent has not previously received service in the batch.

There is a source of unfairness even in the above assured access protocols. In every batch, an agent receives service after all agents in the batch that have higher identities have received service. For example, in multiprocessor systems in which the processors do not continue executing while waiting for a memory request to be satisfied, this means that the lower-identity processors execute at a slower rate. The difference in throughput between the most favorably treated agent (i.e. the agent with the highest assigned identity) and the least favorably treated agent may be 10%, and can be as high as 100% for each of the protocols described above. Tightly coupled parallel algorithms are often sensitive to the speed of the slowest processor. In this case, the unfairness can affect total system performance.

Priority scheduling of urgent requests may be integrated with the assured access protocols in the parallel contention arbiter. In this case, agents follow the assured access protocol for non-priority requests, but ignore the protocol and compete in every arbitration for priority requests. Furthermore, an extra line can be provided on the bus, to be treated as the most significant bit of the agent's identity. Agents with priority requests assert this line during arbitration; agents with non-priority requests do not. This guarantees that all priority requests will be served before non-priority requests.

Prior art arbitration protocols have not been able to economically insure fairness. The star arbitration method may be fair, but it also may be expensive. The assured access protocols for the parallel contention arbiter are relatively inexpensive, but are unfair. The present invention successfully implements a fair arbitration protocol for priority arbiters. When used in a parallel contention arbiter, fairness can be inexpensively achieved.

SUMMARY OF THE INVENTION

The present invention is a first-come first-serve multiprocessor bus arbitration protocol. The protocol is an improvement or extension to the parallel contention arbiter in which each agent is assigned a unique static k bit identity or address. In addition to this static identity portion, each agent is assigned a dynamic portion of its binary identity with the dynamic portion having greater significance than the static portion. The arbitration protocol requires stations to determine in the maximum identity from a plurality of identities contending for the bus, each identity having dynamic and static portions, with the maximum identity gaining control of the bus. The dynamic portions of the identities are incremented on a predetermined global event so that the identity of the station gets larger as it waits for access to the bus.

There are two methods for implementing the dynamic portion of each agent's identity. Each station carries a counter which stores its dynamic portion of its identity and the counter is set to zero whenever the agent initially requests control of the bus. The number in the counter is incremented while an agent is waiting to gain control of the bus. The first method of implementing the protocol is to increment the counter each time the agent loses in an arbitration. The second method for implementing the protocol requires an additional line on the bus known as the increment line which an agent asserts for a short period of time when it wants to implement a request for the bus. All agents which are waiting for access to the bus increment their counters each time the increment line is asserted.

The first-come first-serve protocol described herein is simple and efficient to implement and can be implemented so as to be nearly perfectly fair. Thus the overhead in determining any arbitrations is not significant while the implementation the system can add significantly to the overall throughput of the multiprocessor system by spreading the load more fairly among the processors participating in parallel processing.

It is an object of the present invention to provide a multiple processor bus arbitration protocol that can achieve great fairness while still being implemented efficiently and economically.

It is another object of the present invention to provide an improved fairness bus arbitration protocol that minimizes the additional processing overhead that must be associated with each bus arbitration.

Other objects, advantages, and features of the present invention will become apparent from the following specification when taken in conjunction with the accompanying drawings.

DESCRIPTION OF THE PREFERRED EMBODIMENTS

Figure 1:
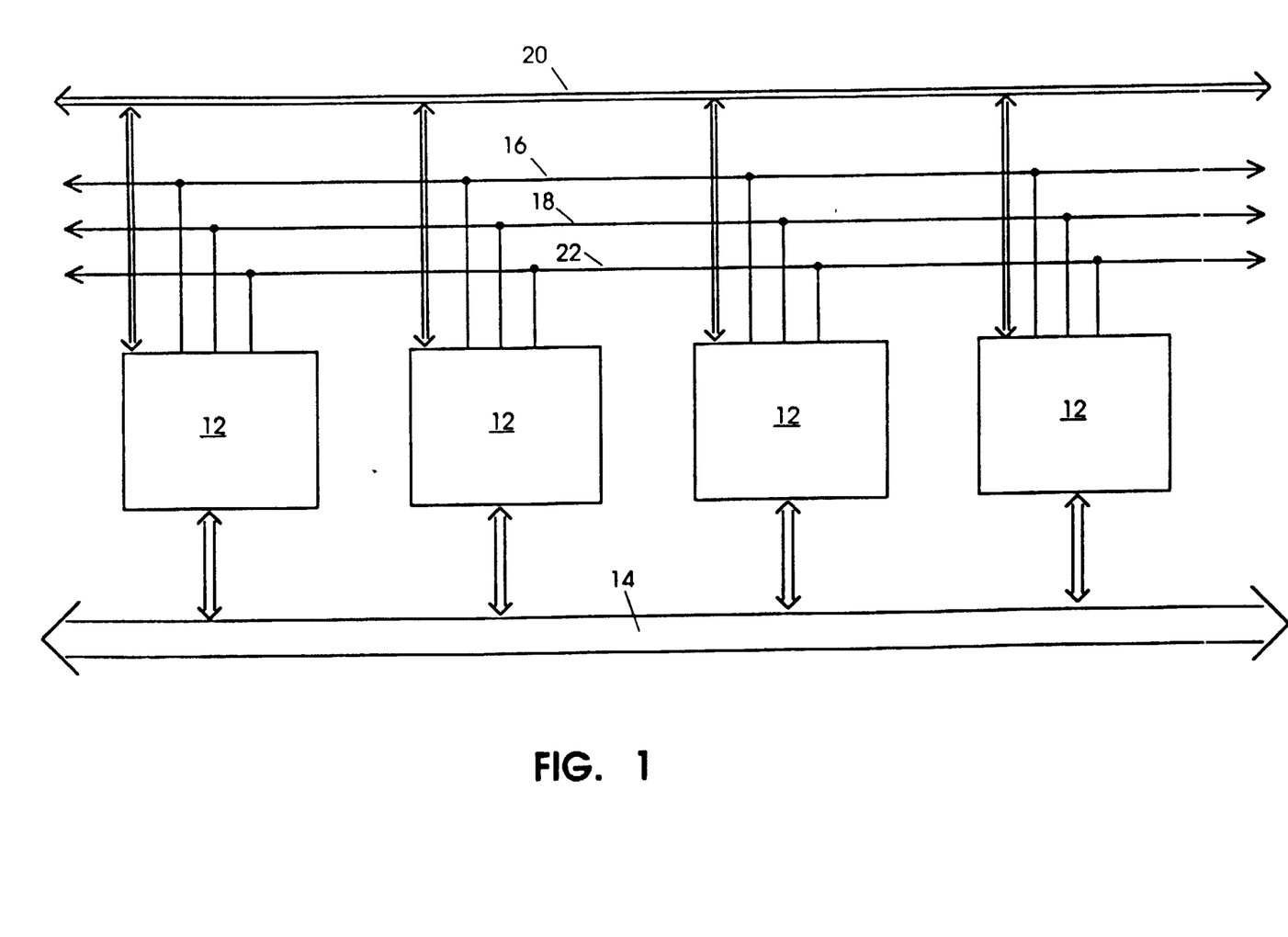
FIG. 1 shows a portion of a bus having a plurality of agents on which the method of the present invention may be implemented.

The arbitration protocol of the present invention can be characterized as an improved first-come first-serve arbitration protocol but as an extension and improvement of the parallel contention arbiters described above. As in a parallel contention arbitration scheme, there is a series of agents 12 competing for control of a bus 14. A shared wired-OR bus requests line 16 as connected to each agent 12 as well as control lines 18 for starting arbitration. A parallel arbitration bus 20 has a number of lines k equal to $2 \times [\log_2 (N+1)]$, or twice the number of lines normally associated with a parallel contention arbiter if there are to be N agents. The agents 12 are also connected in a wired-OR logic to the arbitration bus 20. For one variation of the present invention, there is an additional wired-OR line designated increment line 22, which will be discussed below.

Figure 2:
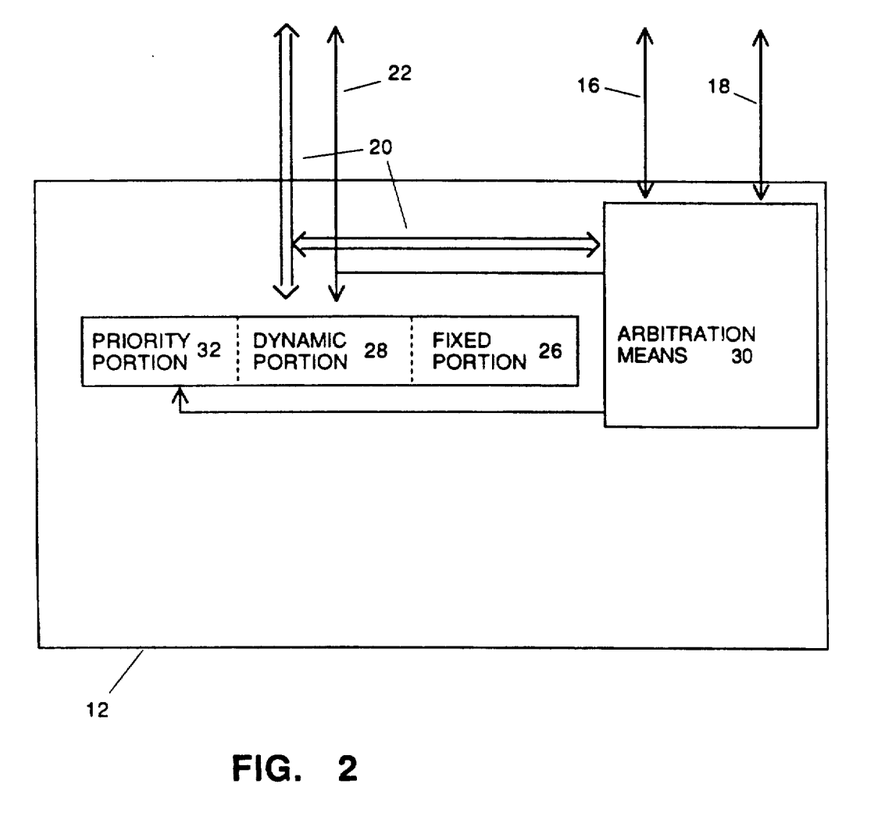
FIG. 2 shows a portion of an agent in the system of FIG. 1.
Figure 3:
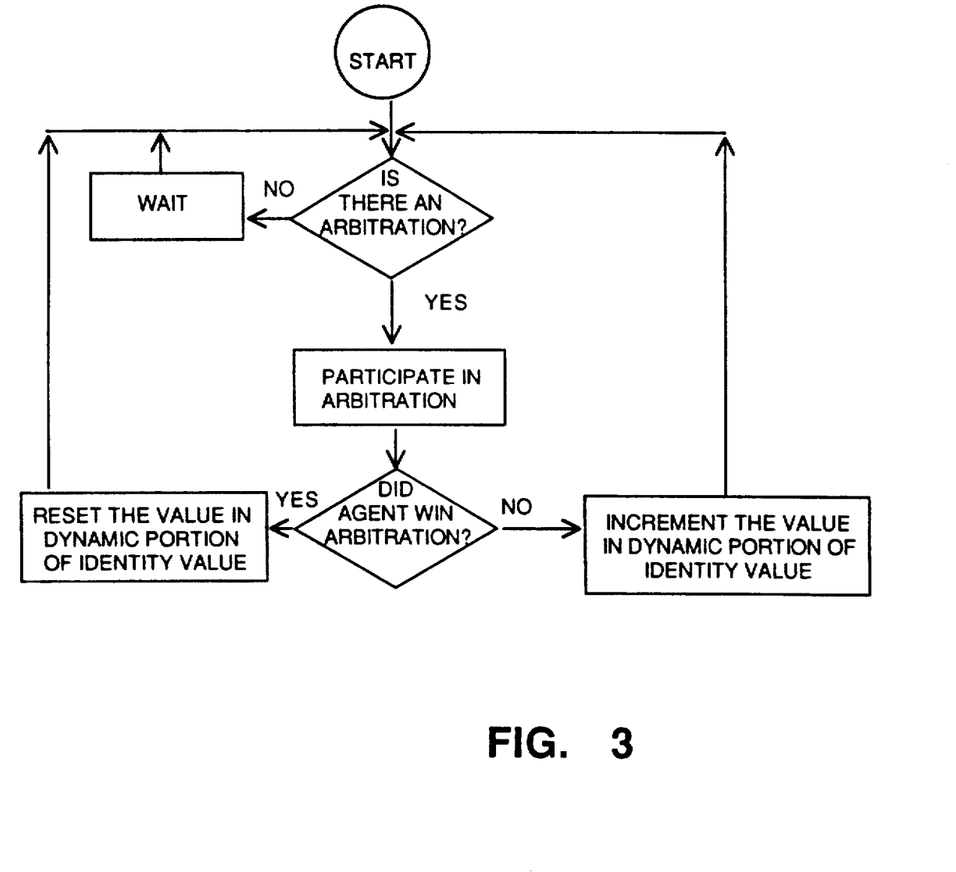
FIG. 3 is a flow chart diagram of the arbitration process described below.

This first-come first-serve arbitration protocol makes use of identity values indicated by the reference numeral 24 in FIG. 2, for each of the agents which is composed of two parts. The lower-most k bits of each agent's identity value 26 is a fixed pre-assigned identity value similar to the numbers which would be used in a standard parallel contention arbiter. In addition to its fixed portion, the identity of each agent includes a second and more significant part 28 which is a value defined by a counter which indicates how long a request has been waiting for access to the bus relative to other requests also waiting for access. This counter is set to zero whenever the agent initially requests access to the bus, or whenever the agent has a new request originating for access to the bus, and then is incremented upwardly upon a pre-defined global event that occurs while the agent is waiting for ownership of the bus to be assigned to it.

In concept, the most significant portion of the identity value for each agent goes larger the longer the agent has waited for access to the bus. Any agent wanting control of the bus asserts the shared bus request line 16 as it would in a normal parallel contention arbiter. In any given arbitration, all of the agents waiting for access to the bus compete in the arbitration using their total composite identity consisting of both their fixed and variable portions of their identity. Because the output of the variable portion, or the output of the counter, is used as the most significant bit of the full identity, the maximum finding algorithm implemented by the arbitration means 30 as would normally be used in a parallel contention bus can be used to select the agent with the highest counter. Thus this algorithm gives priority to the agents which have waited the longest and thus results in a first-come first-serve protocol which is the goal of the algorithm.

The implementation of the first-come first-serve protocol requires that the counters on all the agents waiting for the bus be incremented by a common designated global event. The particular global event that is chosen depends on the characteristics of the system and the number of additional lines available. Two alternative embodiments for implementing the counters using different global events will be discussed below. However, no matter which event is used to increment the waiting time counter, there will always be some chance that two agents will implement the global event at different instant, but within the interval of the event that causes the counters to be incremented, and thus would arrive at the same waiting time period in their counters. Thus whatever strategy is utilized for incrementing the counters must have a provision for the possibility that waiting time counters would have equal values. It is to provide for this circumstance that the agents have a static portion of their identity values, so that the higher static identity agent wins in this case. The selection of a global event chosen to increment the counters on the system has an impact on the of the likelihood that this event will occur, and also has an impact on the nature of the hardware needed to implement the counting mechanism.

The simpler but less accurate strategy for implementing the waiting time counters in the system is to increment the waiting time counter for each agent each time the agent loses in an arbitration. Under this embodiment, any two agents that generate requests during the same interval between two successive arbitrations will, after the next arbitration, have the same value in their waiting time counters. Thus, in this embodiment, the global event is an arbitration in which all interested agents may participate. If there is a significant time period between arbitrations, there may in fact be groups of agents that all have the same values in their waiting time counters. In this instance, arbitrations between agents having the same values in their waiting time counters will be served in order of the statically assigned portions of their total identity value. Otherwise, agents will be served in first-come first-serve order. If each agent may have a maximum of one outstanding request for the bus, then N is the maximum number of requests that can receive service while the agent waits for control of the bus. Thus the hardware logic needed to implement this embodiment is a simple modulo-N waiting time counter that is incremented once when the agent participates in an arbitration and loses and which is reset to zero when the agent participates in an arbitration and wins. While this embodiment for implementing first-come first-serve is simple and requires minimum hardware, it might allow, over time, the agents with higher statically assigned identity values to gain access to the bus at a more often, or with a preferred frequency, compared to agents having a lower statically assigned identity vale. This arises since there may be some likelihood that several agents at any given time will have identical values in their waiting time counters.

A second embodiment for defining the global event which increments the waiting time counters requires the extra increment line 22 on the bus. This is another wired-OR line connected to all of the agents and which the agents sense when it is asserted. Any agent that wishes access to the bus asserts the increment line for a very short period of time, and may do so only when it senses that the line is not presently being asserted by another agent. The time for asserting this line should be very short, something on the order of two or four bus propogation delays, to minimize as much as possible the likelihood of multiple agents asserting the line during this time period. Under this scenario, the assertion of the increment line by an agent is the global event which would thereby increment all of the counters in the agents waiting for access to the bus. While the shortness of the time that the agent asserts the increment line minimizes the probability of two agents asserting the line at the same time, it is nevertheless possible still to have two agents asserting the increment at the same time. Again, in this eventuality the two agents will have the same values in their waiting time counters, and will be served in order of their statically assigned portions of their identity values. However the length of the interval in which this can occur is defined by the time it takes for each agents to sense the increment line, generate an asserting signal for the increment line, and propogate the signal along the bus. This interval is by definition much smaller than the time between successive arbitrations. Thus the second embodiment implements the first-come first-serve goal of this protocol more closely than does the first embodiment, without requiring the counters to have any more bits than the first embodiment. However the logic necessary to implement the second embodiment does raise one more slight complication due to the need to generate the increment line signal when a new request arrives, the ability to sense that signal, and, of course, the extra line on the bus.

One attrative optional feature of the first-come first-serve protocol is that it can easily be modified or extended to allow each agent to have more than one active request waiting for access to the bus, while still serving all requests in a first-come first-serve order. If a multiple number of outstanding requests is allowed for each agent then, however, the number of bits on the arbitration bus 20 would have to be expanded. If the maximum number of outstanding request for each agent is r, then one would need $\log_2 r$ more bits to accomplish this modification. For example, allowing each agent to have up to eight requests outstanding can be implemented with only three additional lines and a small increase in arbitration delay.

Another extension which can be added to the first-come first-serve arbitration protocol described here is the accommodation of priority requests. This feature can be implemented by adding yet another portion 32 to the composite identity value for each agent with this third portion of the identity being the most significant in value and represented by a single bit. Then any agent needing a priority access to the bus could utilize the priority portion of a composite identity by implementing a one as its most significant bit in its identity value when it seeks a priority access to the bus. The second, and next most significant portion of the agents composite identity value remains the waiting time counter that implements the first-come first-serve underline protocol. However, the implementation of priority requests may introduce some complexity into the mechanism for incrementing the waiting time counters in each agents for non-priority requests. This complexity arises because any number of priority requests can increment the waiting time counters for the various agents before any given non-priority request. Thus, in principal, the waiting-time counters can overflow due to numerous priority requests before ever gaining access to the bus. One solution to this problem would be to simply ignore it and increment the counters as specified in the two embodiments above under the assumption that the likelihood of overflow is small, if the number of priority requests is small relative to the number of non-priority requests. Another strategy is to update the waiting time counter of an agent only if the priority bit of the identity value of the agent which won the protocol is the same as the value of the priority bit for the agent which is waiting for access to the bus. In this case the value of the waiting time counter for a non-priority request correctly specifies the number of intervals that the various agents have been waiting relative to each other, although the intervals may be larger since it is measured by the time between two successive arbitrations in which no priority requests compete as opposed to the number of successive arbitrations overall. The relative merits of these approaches compared with allowing the counter to overflow is highly dependent on the workload of the bus. A last strategy for implementing a priority request would be to in addition to the increment line have an increment priority line and to increment waiting time counters either for priority or for non-priority events depending on whether the agent is asserting a priority or non-priority requests for bus access.

The main additional complexity introduced to a parallel contention arbiter by a first-come first-serve protocol discussed here arises from the need to accommodate the dynamic portion of the identity values of the agents, which implies an additional $\log_2 N$ bits for the arbitration bus. The doubling of the size of this bus also implies a larger overhead for the maximum finding algorithm necessary during the arbitration to determine which of the agents has the largest identity value. It is possible that binary patterned arbitration lines can be used for the lines that carry the static portion of the agents identities to compensate for the higher overhead. Another alternative is to use fewer bits in the dynamic portion of the arbitration bus, on the theory that this would implement the protocol in most instances failing only when the bus is close to saturation.

Computer simulations of the effect of the first-come first-serve arbitration protocol have been performed to investigate the practical potential for unfairness in the system. This protocol, in contrast to another type of protocol referred to round-robin, has some potential for unfairness. The second embodiment of the first-come first-serve protocol described above was also tested on the theory that it would achieve nearly perfect fairness although would add some to the overhead of the system. The results of the simulations were to indicate that the simple first embodiment of the first-come first-serve arbitration protocol is generally quite good in terms of fairness. The maximum difference in throughput of the parallel processors was determined to be approximately six to eight percent, which difference occurred near the point at which the bus becomes totally saturated. This result is quite favorable when compared with assured access protocols at high load. If more perfect fairness is necessary in a first-come first-serve protocol, the second embodiment which would lessen any potential unfairness could be used. It also was found that a potential advantage of the first-come first-serve arbitration protocol is that it has a lower variance in bus waiting times a factor, which could be significant in systems where bus requests can be made in advance of the time when the access to the bus is actually needed.

Thus it is described above a protocol for implementing a first-come first-serve bus arbitration protocol which is efficient and simple and yet which has an inherently high degree of fairness while adding minimally to any necessary hardware overhead to the multiple processor computing system.

While the invention has been particularly shown and described with reference to the preferred embodiments thereof illustrated here, it will be understood by those skilled in the art that various changes in form and details may be made from the embodiments described herein within the spirit and scope of the invention as described in the following claims.

What is claimed is:

1. A method of arbitrating control of a shared bus among a plurality of agents connected to the bus, each agent provided with a total identity value including a less significant static portion and a more significant dynamic portion, an increment line and a request line being wired to all the agents, comprising the steps of
   (a) any agent desiring control of the bus imposing a signal on the increment line for a time period much smaller than the time between possible arbitrations, the dynamic portion of the agent's total identity value being zero at the time of the assertion;
   (b) for each agent which has asserted the increment line and has not yet gained control of the bus, each such agent incrementing the value in the dynamic portion of its total identity value once each time when it senses a signal on the increment line by any other agent; and
   (c) each time the bus becomes available, conducting an arbitration for control of the bus in a single step arbitration based on the total identity values of the agents seeking control of the bus and awarding control to the agent with the largest total identity value, so that the agent awarded control of the bus will have the highest dynamic portion of its total identity value and thus will have waited the longest for control of the bus.

2. A method as claimed in claim 1 wherein the total identity value for each agent further comprises a priority value of a higher significance than the dynamic portion of each identity value, each agent incrementing its priority value so that it is greater than zero only when it has a priority request for control of the bus, the priority value being included in the total identity value included in each arbitration.

3. A computing system comprising
   a bus;
   a plurality N of agents sharing the bus, each agent including means for storing a total identity value including two parts, a least significant part consisting of a fixed assigned unique identity value and a most significant part being a dynamic portion which is set to zero initially;
   a shared bus request line connected to each agent so that each agent may request access to the bus;
   control lines connected to each agent to initiate an arbitration for control of the bus among the agents;
   an increment line connected to each agent, each agent connected so as to be able to briefly impose a signal on the increment line once when the agent seeks to participate in an arbitration of the bus;
   a wired-OR parallel arbitration bus connected to each agent and having 2 times log2(N+1) lines and connected to the agents so as to carry thereon the total identity values of the agents; and
   each of the agents having means for imposing its total identity value on the parallel arbitration bus and for comparing the value each such agent is imposing on the parallel arbitration bus with the value on the parallel arbitration bus, so that among all the agents the agent with the largest total identity value will gain control of the bus, and each of such agents having means to increment the value of the dynamic portion of its identity value when a signal is imposed on the increment line by any other agent during a time when each such agent is seeking to gain control of the bus, so that the winner in a single stage arbitration will be the one agent among all the agents that has counted the largest number of signals on the increment line, with ties being decided by the fixed portion of the identity value.

4. A method of arbitrating control of a shared bus among a plurality of agents connected to the bus, each agent provided with a total identity value including a less significant static portion and a more significant dynamic portion, the agents connected by a parallel arbitration bus, and a request line being wired to all the agents, the method comprising the steps of
   (a) any agent desiring control of the bus participating in each arbitration by presenting its total identity value on the arbitration bus, the one agent among all the agents presenting the highest total identity value on the arbitration bus being awarded control of the bus in a single step arbitration;
   (b) for each agent which participates in the arbitration and which does not gain control of the bus, each such agent incrementing the value in the dynamic portion of its total identity value once for each arbitration in which each such agent participates and does not gain control of the bus; and
   (c) for the one agent gaining control of the bus as the result of an arbitration, resetting the dynamic portion of the total identity value for that one agent to zero, so that each arbitration is conducted in a single step and so that the one agent awarded control of the bus will have the highest dynamic portion of its total identity value, and thus will have waited through at least as many arbitrations for control of the bus as any other agent.

5. A method of utilizing distributed processing to arbitrate control of a shared bus among a plurality of N agents connected to the bus, each agent provided with a total identity value including a less significant static portion and a more significant dynamic portion, and the agents connected by a wired-OR parallel arbitration bus having two times the log to the base two of N+1 lines, the method comprising the steps of
   (a) any agent desiring control of the bus participating in each arbitration by presenting its total identity value on the arbitration bus, each of the agents comparing the value on the bus with its own total identity value to determine if it has gained control of the bus, the one agent among all the agents which has the highest total identity value being awarded control of the bus;
   (b) for each agent which participates in the arbitration and which does not gain control of the bus, each such agent incrementing the value in the dynamic portion of its total identify value once for each arbitration in which each such agent participates and does not gain control of the bus; and (c) for the one agent gaining control of the bus as the result of an arbitration, that one agent resetting the dynamic portion of its total identity value set to zero, so that each arbitration is conducted in a single step, in parallel, by each of the agents so that the one agent awarded control of the bus will have the highest dynamic portion of its total identity value, and thus will have waited through at least as many arbitrations for control of the bus as any other agent.

* * * * *

UNITED STATES PATENT AND TRADEMARK OFFICE
CERTIFICATE OF CORRECTION

PATENT NO. : 5,274,774
DATED : December 28, 1993
INVENTOR(S) : Udi Manber, et. al.

It is certified that error appears in the above-indentified patent and that said Letters Patent is hereby corrected as shown below:

Column 1, before line 5, the following text should appear as the first paragraph-- Statement Regarding Federally Sponsored Research This invention was made with United States Government support awarded by the National Science Foundation (NSF), Grant No. DCR-84-51405. The United States Government has certain rights in this invention--.

Signed and Sealed this

Seventeenth Day of May, 1994

Attest:

BRUCE LEHMAN

*Attesting Officer*  *Commissioner of Patents and Trademarks*